United States Patent
Juhola

(10) Patent No.: US 6,582,552 B1
(45) Date of Patent: Jun. 24, 2003

(54) METHOD AND DEVICE FOR EVAPORATING LIQUID

(75) Inventor: Pentti Juhola, Espoo (FI)

(73) Assignee: Rinheat Oy, Espoo (FI)

( * ) Notice: Subject to any disclaimer, the term of this patent is extended or adjusted under 35 U.S.C. 154(b) by 0 days.

(21) Appl. No.: 09/890,558

(22) PCT Filed: Feb. 4, 2000

(86) PCT No.: PCT/FI00/00080

§ 371 (c)(1),
(2), (4) Date: Sep. 14, 2001

(87) PCT Pub. No.: WO00/45927

PCT Pub. Date: Aug. 10, 2000

(30) Foreign Application Priority Data

Feb. 4, 1999 (FI) .................................................. 990215

(51) Int. Cl.⁷ ............................... B01D 3/34; C02F 1/04
(52) U.S. Cl. ......................... 159/47.3; 23/295; 159/29; 159/45; 159/33; 159/901; 159/DIG. 13; 159/DIG. 17; 210/774
(58) Field of Search ................. 203/98.2, 100, 203/48, 98, DIG. 8, 7; 202/185.2, 160; 159/29, 47.3, 901, DIG. 13, 33, DIG. 17, 45; 23/295; 210/774

(56) References Cited

U.S. PATENT DOCUMENTS

| | | | |
|---|---|---|---|
| 3,891,496 A | | 6/1975 | Erwin |
| 3,939,036 A | * | 2/1976 | Erwin ........................ 159/15 |
| 4,007,094 A | | 2/1977 | Greenfield et al. |
| 4,270,974 A | | 6/1981 | Greenfield et al. |
| 5,047,124 A | * | 9/1991 | Haberland ................. 159/16.1 |
| 5,205,906 A | * | 4/1993 | Grutsch et al. ........... 159/47.3 |
| 5,772,851 A | * | 6/1998 | Barwich et al. .......... 159/16.1 |
| 6,034,288 A | * | 3/2000 | Scott et al. ................. 570/102 |

* cited by examiner

Primary Examiner—Virginia Manoharan
(74) Attorney, Agent, or Firm—Burns, Doane, Swecker & Mathis, L.L.P.

(57) ABSTRACT

A liquid evaporation method and apparatus wherein the contamination of the heat transfer surfaces is avoided by using a special circulating fluid. The liquid to be evaporated is heated in direct contact with the circulating fluid and conveyed to a vapor separation tank. In the evaporator according to the invention, heat transfer surface contamination may be limited by mixing the liquid to be evaporated with the circulating fluid only after the heat exchanger so that the heat surface contaminating liquid to be evaporated does not make direct contact with the heat surface.

8 Claims, 1 Drawing Sheet

METHOD AND DEVICE FOR EVAPORATING LIQUID

FIELD OF THE INVENTION

This invention relates to evaporation technology. In particular, this invention concerns a method and an apparatus for evaporating a liquid rich in impurities in such a way that no contaminating deposits are formed in the apparatus, especially on the heat transfer surfaces.

BACKGROUND OF THE INVENTION

In order to avoid contamination, forced circulation evaporators and relatively high flow rates are often employed in the evaporation of contaminating liquids. In the forced circulation evaporation, contamination can also be reduced by placing the heat exchanger at such a low level that the vaporization takes place only in the riser and in the separation tank, after the heat exchanger. If the contamination of the heat surfaces cannot be prevented by means of process engineering, devices provided with continuous mechanical cleaning, such as scraped surface evaporators, are used, or the heat surfaces are cleaned at regular intervals. The same problems are encountered in evaporation crystallization.

DISCLOSURE OF THE INVENTION

It may be possible according to aspects of the invention is to provide a liquid evaporation method, wherein contamination of the heat transfer surfaces is avoided by using a special circu lating fluid by means of which the liquid to be evaporated is heated and conveyed to a va por separation tank. The circulating fluid must have a substantially lower vapor pressure than the liquid to be evaporated and it is not allowed to react chemically with the liquid to be evaporated. Furthermore, the, the solids separating from the liquid to be evaporated must be wetted but not dissolved by the circulating fluid, in order to prevent their sticking to the walls of the apparatus.

It may be possible according to aspects of the invention is to provide a liquid evaporation apparatus, that makes it possible to evaporate a liquid, according to the method of the in vention, by means of a circulating fluid acting as a heat transfer medium. In the evaporator according to the invention, heat transfer surface contamination is also suppressed by mix ing the liquid to be evaporated with the circulating fluid only after the heat exchanger, whereby the heat transfer surface contaminating liquid to be evaporated does not make direct contact with the heat surface.

Preferably, the liquid to be evaporated is substantially insoluble in the circulating fluid. A mechanical mixer or an ejector can be used to ensure that the liquid to be evaporated is mixed with the circulating fluid. By mixing the liquid to be evaporated in the form of small drops with the circulating fluid and by using a turbulent flow in the tube, a contribution is made to the transfer of heat from the circulating fluid to the evaporating droplet. The droplet begins to evaporate when the vapor pressure of the liquid to be evaporated is higher than pressure in the tube. By using a pressure control valve, the vaporization can be adjusted to take place only after the pressure control valve. Since most of the heat required for the evaporation has to be transferred to the droplets of the liquid to be evaporated during vaporization, it is important to dimension the tube located after the pressure control valve in such a way that there is a two-phase flow form favorable to heat transfer in the tube and that the residence time in the tube is long enough. The residence time can be extended by disposing the pressure control valve at a substantially higher level than the separation tank so that the liquid flows downward in the tube in which the vaporization takes place, and the static pressure difference enhances the vaporization, thus compensating for the effect of pressure loss due to flow.

In the separation tank, the vapor is separated from the circulating fluid and conveyed to a condenser. The lower part of the separation tank can be provided with a mass transfer surface (with filling units, for example) in order to remove the biggest possible amount of liquid to be evaporated from the fluid returning into the cycle. The circulating fluid is pumped, together with the solids (crystallized or precipitated) separated from the liquid to be evaporated, to be re-heated in a heat exchanger. A small, continuous flow of circulating fluid can be conveyed out of the system after the pump, in which case a corresponding amount of fresh circulating fluid is fed into the circuit to maintain the solids content of the circulating fluid at a desired maximum level. The solids content of the circulating fluid can also be lowered by means of a separator, filter or another separating device, such as a decanter or settling tank.

The temperature of the circulating fluid in the separation tank and after the heat exchanger is chosen in such a way that most of the liquid to be evaporated vaporizes and the circulating fluid in the separation tank contains only a small amount of liquid to be evaporated, or none at all. The rise in boiling temperatures and the deviation from equilibrium caused by salts have to be considered when choosing the temperatures of the circulating fluid.

The evaporation process according to the invention can be designed to use either pump circulation (forced circulation) or natural circulation. Natural circulation is created by means of vapor bubbles, by arranging the vaporization to occur in a tube rising toward the separation tank.

The evaporation process according to the invention can be designed to be carried out at positive pressure, atmospheric pressure or negative pressure. In terms of contamination and energy consumption, the most preferable evaporation pressure is negative.

Preferably, the method according to the invention can be used for evaporating wastewater saturated or nearly saturated with salts by using, as the circulating fluid, oil or waste oil which is appropriately incinerated after use in order to dispose of the noxious substances.

In order to save energy, the evaporation process can also be designed as a single or multiple stage process, in which case the vapor coming from the previous effect is led to be condensed in the circulating fluid heat exchanger of the following stage. As far the liquid to be evaporated is concerned, the stages are connected in parallel, i.e. each stage is provided with an own supply of evaporation liquid.

The method can be applied to evaporation crystallization by separating the crystals formed in the circulating fluid from the fluid using a centrifuge, a separator or other mechanical separating device, and the crystals thus recovered are washed with a suitable solvent.

BRIEF DESCRIPTION OF THE DRAWINGS

The invention will be described in more detail in the following with reference to the accompanying drawing wherein.

DETAILED DESCRIPTION

Figure 1:
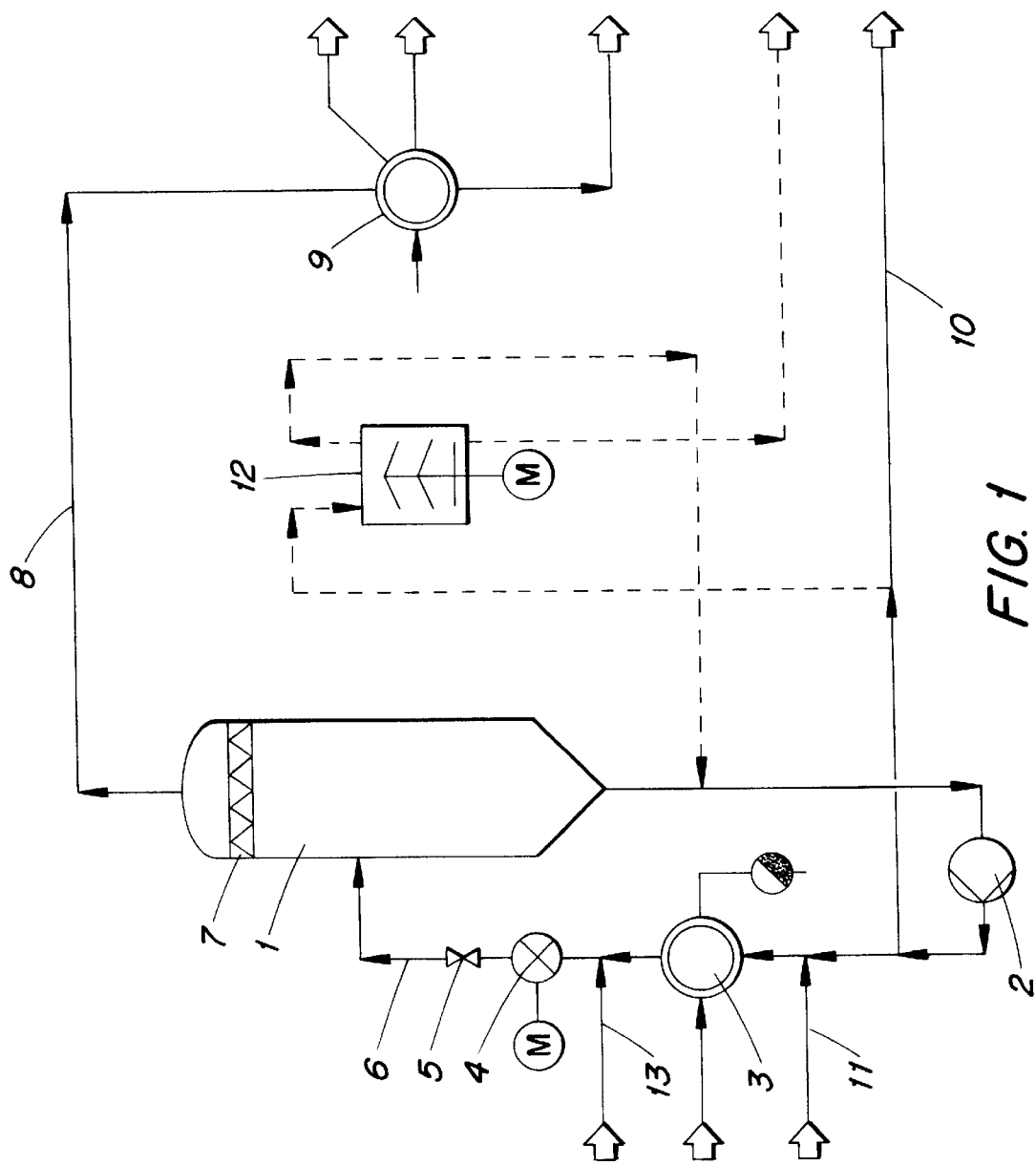
FIG. 1 schematically shows an evaporation or crystallization apparatus according to the invention.

In the embodiment of the invention shown in FIG. 1, the liquid to be evaporated and the circulating fluid are constituted by wastewater and oil, respectively. The evaporation takes place at ambient pressure.

The apparatus comprises a pumping/separation tank 1, a circulating pump 2, a heat exchanger 3, a line mixer 4, a condenser 9 and pipework with the necessary valves interconnecting said parts. The circulating pump 2 pumps the circulating fluid from the tank 1 to the heat exchanger 3 where the circulating fluid is heated, e.g. with vapor. After the heat exchanger 3, wastewater to be evaporated is mixed into the circulating fluid from a line 13. In order to mix the wastewater and the circulating in the best possible way and to achieve the best possible heat transfer between the liquids, the liquid flow is led through the line mixer 4. The mixing of the water with the oil can be stimulated by introducing an emulgator into the oil. The pressure is kept so high in the line mixer by means of a throttle valve 5, that the water does not vaporize. As the pressure is reduced after the throttle valve 5, the water mixed with the circulating fluid begins to vaporize in the pipeline 6. The vaporizing water extracts the heat required for vaporization from the surrounding circulating fluid, which consequently gets cooler. The circulating fluid and the vapor are separated in a separation space located in the upper part of the tank 1. The separation space can also be shaped like a cyclone. The vapor passes, via a droplet separator 7 and a pipeline 8, from the separation space to a condenser 9 where it is condensed into water.

In the heat exchanger 3, a sufficient amount of heat is supplied to the circulating fluid to maintain the temperature so high also in tank 1, that the water content of the circulating fluid leaving the tank is low enough to prevent contamination of heat exchanger 3.

The solids entered together with the wastewater remain in the circulating fluid, forming precipitates therein. In order to dispose of the precipitate, the circulating fluid is replaced and/or removed continuously by expelling a proportion of the fluid from the circuit via a pipeline 10 branching off after the pump 2. A corresponding amount of fresh circulating fluid is fed into the evaporator via a pipeline 11. The circulating fluid removed can also be cleaned by means of a mechanical separator 12, and returned into the cycle, thus reducing the circulating fluid consumption.

What is claimed is:

1. A method of evaporating or crystallizing a heat transfer surface contaminating liquid comprising:

supplying heat required for evaporation of the liquid to be evaporated to the liquid to be evaporated when the liquid to be evaporated is in direct contact with a heat-supplying circulating fluid having a substantially lower vapor pressure than the liquid to be evaporated;

heating the circulating fluid in a heat exchanger prior to mixing the liquid to be evaporated with the circulating fluid; and separating vapor generated by the liquid to be evaporated from the circulating fluid in a separation tank, wherein a temperature to which the circulating fluid is heated is set so that a temperature of the circulating fluid leaving the separation tank is higher than a boiling temperature of the liquid to be evaporated at a pressure in the separation tank, complemented by a rise in boiling temperature due to impurities.

2. A method as defined in claim 1, comprising removing solids from the circulating fluid by a mechanical separator.

3. A method as defined in claim 2, comprising continuously removing circulating fluid, and continuously introducing fresh circulating fluid to replace the circulating fluid that is removed.

4. A method as defined in claim 1, comprising continuously removing circulating fluid and continuously introducing fresh circulating fluid to replace the circulating fluid that is removed.

5. A method as defined in claim 1, wherein the circulating fluid is oil.

6. A method as defined in claim 1, wherein the liquid to be evaporated is wastewater containing a substance that contaminates heat transfer surfaces in direct surface contact.

7. A method as defined in claim 1, wherein the circulating fluid is waste oil.

8. A liquid evaporation apparatus comprising:

means for circulating a circulating fluid used as a heat transfer fluid;

means for heating the circulating fluid;

means for introducing a liquid to be evaporated into the circulating fluid; and a separation tank for separating vapor generated by the liquid to be evaporated and the circulating fluid from each other, wherein the means for introducing the liquid to be evaporated into the circulating fluid is located downstream from the heating means, and the heating means is arranged to heat the circulating fluid to a temperature so that a temperature of the circulating fluid leaving the separation tank is higher than a boiling temperature of the liquid to be evaporated at a pressure in the separation tank, complemented by a rise in boiling temperature due to impurities.

* * * * *